United States Patent

Shortes

[15] 3,639,138
[45] Feb. 1, 1972

[54] PHOSPHOR SCREEN FABRICATION

[72] Inventor: Samuel R. Shortes, Dallas, Tex.

[73] Assignee: Texas Instruments Incorporated, Dallas, Tex.

[22] Filed: May 27, 1968

[21] Appl. No.: 732,328

[52] U.S. Cl. .................................................117/33.5 CS
[51] Int. Cl. ......................................................H01j 31/10
[58] Field of Search..................................................117/33.5

[56] References Cited

UNITED STATES PATENTS

| | | | |
|---|---|---|---|
| 2,678,888 | 5/1954 | Evans | 117/33.5 |
| 2,906,639 | 9/1959 | Seats et al. | 117/33.5 |
| 2,914,420 | 11/1959 | Togias | 117/33.5 |
| 2,944,916 | 7/1960 | Evans | 117/33.5 |

Primary Examiner—Alfred L. Leavitt
Assistant Examiner—Wayne F. Cyron
Attorney—Samuel M. Mims, Jr., James O. Dixon, Andrew M. Hassel, Harold Levine, Melvin Sharp and James C. Fails

[57] ABSTRACT

This specification discloses a method of applying first and second phosphor particles to a display screen wherein first phosphor particles are smaller in diameter than the second phosphor particles characterized by the steps of:

a. immersing a transparent screen in water, b. suspending the first and second phosphor particles in the water, c. adding a silicate to the water, and effecting a pH in the range of 7–8 to form gelatinous silicic acid and envelope the larger phosphor particles with the gelatinous silicic acid.

d. allowing time for the second phosphor particles and their gelatinous silicic acid envelope to settle onto said screen, e. adding an acid to the water to effect a pH of 1–5 and form nongelatinous, semicrystalline, precipitating form of silicic acid which entraps the small first phosphor particles, settling the first phosphor particles onto the second phosphor particles, f. allowing time for the precipitating silicic acid and the small phosphor particles to settle onto said second particles on the screen, g. removing the supernatant liquid, and h. heating said screen and said phosphor particles to drive off the water and bond the phosphor particles and the screen to effect a unitary color display screen.

8 Claims, 3 Drawing Figures

SAMUEL R. SHORTES
INVENTOR

BY James C. Failes
ATTORNEY

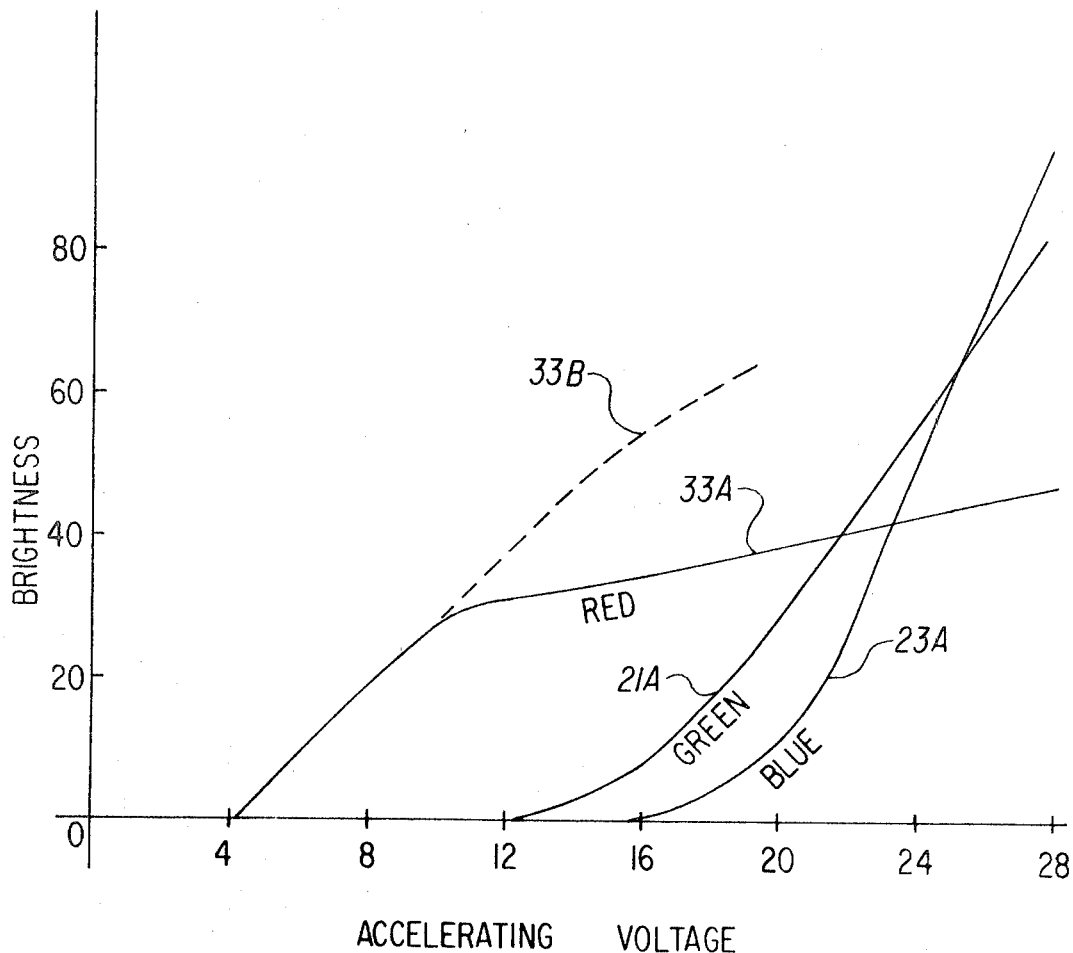

PHOSPHOR SCREEN FABRICATION

BACKGROUND OF THE INVENTION

1. Field of the Invention

This invention relates to color display screens employing light-emitting phosphors and more particularly to a method of applying the phosphors to the display screen.

2. Description of the Prior Art

In recently developed color display systems, screens are employed which include phosphor particles having different color light-emitting characteristics and which are respectively responsive to electrons of differing energies of velocities. In such systems, the viewing screen includes a first phosphor which is energized to emit light having a relatively long wavelength when struck by electrons having at least a first predetermined velocity or beam energy level, and at least one other phosphor which is energized to emit light of a shorter wavelength when struck by electrons having a higher predetermined velocity or beam energy level. The second phosphor is provided with an electron barrier which determines the higher velocity or beam energy level required to excite the second phosphor.

The U.S. Pat. No. 3,371,153, Ser. No. 452,299, filed Apr. 30, 1965, by Walter T. Matzen, discloses a viewing screen constituted of a single thin layer of first and second phosphor particles of different light emitting characteristics, wherein the electron barrier is formed on the surface of the second phosphor particles. A limitation of this viewing screen is the increased light output of the first phosphor particles as the energy of the electron beam increases above the threshold energy for exciting the phosphor.

Copending and coassigned application, Ser. No. 598,828, filed Dec. 2, 1966, now abandoned, by Morton E. Jones, discloses a viewing screen wherein the light output of the first phosphor does not increase substantially with increasing electron energies above a predetermined level whereby the contribution of color from said first phosphor may be controlled. As described in the application, the viewing screen includes a first continuous layer of coated phosphor particles which are energized at a relatively high-energy level to produce light of one or more colors (e.g., blue or green). The first layer is overlaid with a discontinuous layer of colloidal-sized; e.g., less than 1 micron mean effective diameter; particles of a second phosphor which are energized by electrons having energies above a relatively low preselected level to produce red light. The particles of this second phosphor are relatively small in comparison to the particles in the first layer, and the second phosphor particles are scattered over the first layer with gaps between the particles. The second phosphor particles are of such size that electrons having energies above a relatively high-energy level can pass through the particles without producing substantially any more red light than is produced by electrons having energies equal to that relatively high level. Those electrons which have energies above the relatively high-energy level and which pass through the gaps, strike the first layer and produce light of the first color in amounts which increase with increasing electron energies. Thus, electrons having energies below the relatively high-energy level produce red light and electrons having energies above the relatively high-energy level produce light of a color which is a mixture of a limited amount of the red with an amount of the color produced by the particles of the first layer which increases with increasing electron energies.

In the prior art, the discontinuous layer of small particles was not used and the large particles, ordinarily about 5–16 microns in mean effective diameter, were normally applied to the viewing screen by immersing the viewing screen in a liquid suspension of the large phosphor particles and allowing the particles to settle onto the viewing screen. The liquid in which the screen was immersed conventionally contained sodium or potassium silicate. Thereafter, sufficient barium acetate and acetic acid was added to the silicate to adjust the pH of the mixture to approximately neutral, i.e., to a pH of about 7–8. The silicic acid thereby formed in the mixture produced a gelatinous type layer which enveloped the phosphor particles that settled or deposited on the viewing screen. It should be noted that the substantially neutral solution was critical in this prior art method. If the pH of the silicate solution was not decreased to neutral, the necessarily gelatinous type layer did not form. If the pH solution was adjusted to a value less than 7, many of the phosphors which were deposited in the viewing screen during the settling process were pulled off the screen when the liquid was decanted from the screen.

Applicant discovered, in attempting to deposit a thin discontinuous layer of the small phosphor particles on top of the large particles previously deposited in accordance with the prior art, that the small particles would not settle out of the prior art neutral solution, but would remain suspended in the solution.

SUMMARY OF THE INVENTION

It has been unexpectedly found that in the case of the small phosphor particles; i.e., those particles less than 1 micron in size; adjustment of the pH of the solution to a value of 1–5 causes the small particles to settle out of the solution onto the previously deposited layer. After the settling process, the solution may unexpectedly be poured off leaving the small phosphor particles in place in a discontinuous form on the previously deposited layer. The reasons why a solution having a pH less than 5 is necessary for satisfactory deposition of the small particles onto the layer of large particles is not completely understood. Apparently, however, adjustment of the pH to a value of 1–5 effects formation of nongelatinous, semicrystalline, precipitating form of silicic acid within the solution. The precipitating silicic acid accumulates around, and drags to the bottom, the small phosphor particles.

Accordingly, an object of this invention is an improved method of applying colloidal-sized phosphor particles to a color display screen.

Another object of the invention is a method of uniformly applying a discontinuous layer of small phosphor particles to a continuous layer of larger phosphor particles on a color display screen.

Still another object of the invention is a method of applying both a continuous layer of relatively large phosphor particles on a display screen and a discontinuous layer of relatively small phosphor particles on the continuous layer.

Briefly, in accordance with one form of this invention, a color display screen having a continuous layer of relatively large phosphor particles thereon is immersed in an aqueous solution containing admixed therein (1.) an acid pH modifier, (2.) relatively small phosphor particles and water mixed to form a phosphor-water suspension, and (3.) a silicate. The relative proportion of silicate and pH modifier is predetermined or adjusted such that the pH is 1–5, and preferably 2 to 3. Nongelatinous, semicrystalline silicic acid is formed in the solution and aids in settling and adhering the small phosphor particles to the continuous layer of large phosphor particles and, ultimately, the screen. Sufficient time is allowed for complete settling of the phosphor particles; the supernatant aqueous solution is removed from about the screen, as by decanting or siphoning it off; and the screen is removed from the container and is subjected to heat to drive off the water, and bond the phosphor particles and the screen together. The heating step is referred to as "bake-out." It has been found that the small phosphor particles uniformly and adherently settle on the continuous phosphor layer.

Alternatively, a continuous layer of larger phosphor particles and a discontinuous layer of smaller phosphor particles may be formed on the display screen in one process. For example, a transparent screen is immersed in an aqueous solution of a pH modifier. A liquid suspension of the larger and smaller phosphor particles, along with a silicate, is then added to the solution, the relative proportion of pH modifier and silicate being such that the pH of the solution is about 7-8; i.e., essentially neutral. The silicate reacts in the solution to form sufficient gelatinous silicic acid to envelope the settling larger phosphor particles and cause them to adhere to the screen. The small, colloidal-sized phosphor particles remain in colloidlike suspension until an acid pH modifier is added to the solution to bring the pH to less than 5. The acid pH effects the formation of nongelatinous, semicrystalline silicic acid which envelopes the small phosphor particles and causes them to settle onto and adhere to the layer of larger particles, and, if they penetrate the interstices between the large phosphor particles, to the screen. The usual decantation of liquid and bake-out is then effected.

BRIEF DESCRIPTION OF THE DRAWING

FIG. 3 is a graph representing the response of the different phosphor particles to impinging electrons of different energies.

DESCRIPTION OF SPECIFIC EMBODIMENTS

Figure 1:
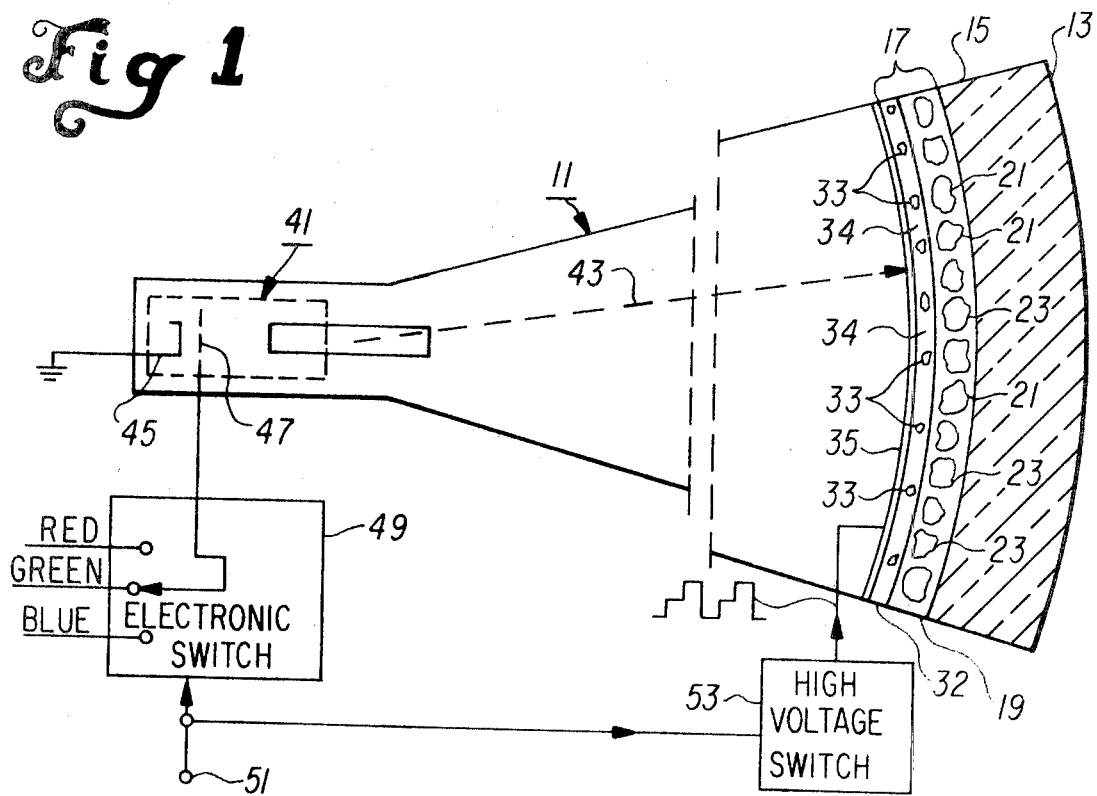
FIG. 1 is a schematic diagram of a color display system employing a display screen having a continuous layer of relatively large phosphor particles and discontinuous layer of relatively small phosphor particles.

Referring now to FIG. 1, there is indicated at 11 an electron display tube such as the kinescope of a color television receiver. The tube includes an electron gun 41 for generating a beam 43 of electrons which is moved in a raster scanning pattern across phosphor screen 17 on the transparent glass faceplate 15 of the screen. Gun 41 includes an electron emissive cathode 45 and a grid 47 for modulating the beam current. By means of an electronic gate or switch 49, the beam current is modulated successively during sequential time intervals by electronic signals which represent red, green and blue color records respectively; e.g., the red, green and blue information signals derived in conventional color television receivers. The switching from one color signal to another may be done on a sequential frame, dot or line basis, and synchronized by a signal applied at terminal 51.

A high-voltage switch 53 is provided to synchronously switch a high voltage applied to screen 17 so that, (1.) while the current is being modulated in accordance with the red signal, a first, relatively low-accelerating voltage; e.g., 12 kilovolts; is applied to the phosphor screen 17; (2.) while the beam current is being modulated in accordance with the green signal, the accelerating voltage is increased to a second, relatively high level; e.g., 18 kilovolts; and, (3.) while the beam current is being modulated in accordance with the blue signal, the accelerating voltage is increased to a third, higher level; e.g., 24 kilovolts.

The phosphor screen 17 on the glass face 15 of display screen 13 includes a continuous layer 19 of relatively large phosphor particles 21 and 23. A discontinuous layer 32 of relatively small phosphor particles 33 is placed on the continuous layer 19.

Figure 2:
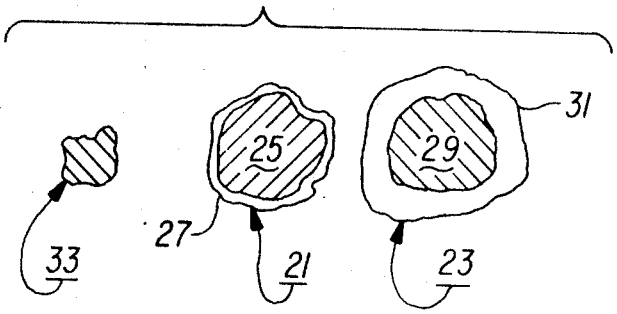
FIG. 2 is a sectional view of phosphor particles employed in the screen of FIG. 1.

FIG. 2 illustrates in cross section the relative sizes of the phosphor particles 33, 21 and 23. Particle 33, on the order of about 0.1 to 1 micron in diameter, is a red light-emitting phosphor; such as, europium activated yttrium vanadate ($YVO_4$-Eu). Particle 21 includes an active, green light-emitting phosphor 25; such as, silver activated zinc-cadmium sulphide coated with a relatively thin surface barrier layer 27. Particle 23 includes an active phosphor 29 of a conventional blue phosphor; such as, silver activated zinc sulphide; coated with a relatively thicker surface barrier layer 21. The barrier layers may be silica. The overall sizes of particles 21 and 23 are, for example, on the order of about 5-16 microns. The electron barriers may be formed on the phosphor particles by an oxidizing and sulphiding process such as described in copending and coassigned application, Ser. No. 561,815, filed June 30, 1966, (TI-2500).

The light outputs or responses of the particles 33, 21 and 23 to excitation by electrons having different energies or velocities are illustrated by the curves 33A, 21A, and 23A in FIG. 3; light outputs in arbitrary units being indicated on the ordinate and accelerating voltages expressed in kilovolts being represented on the abscissa. As is seen from FIG. 3, the particles 33A emit red light when the electron energies exceed a relatively low predetermined level (4 kilovolts) and increases sharply with increasing electron energies to about 10 kilovolts, at which point the electrons begin to pass through the particles 33 rather than transferring increasing amounts of energy to the particles. Thus, the curve 33A tends to level off with only a slight rise with further increases in accelerating voltage above 10 kilovolts. At a relatively high predetermined level of accelerating voltage (12 kilovolts) the electrons which pass through the gaps between the particles 33 begin to penetrate the barrier layer 27 on the green phosphor particles and these particles then emit green light in amounts which increase with increasing electron energies. Similarly, at a still higher energy level (16 kilovolts) electrons begin to penetrate the relatively thick barrier layer 31 of the particles 23 and these particles begin to emit blue light in amounts which increase with increasing electron energies.

The layer 19 (see FIG. 1) of relatively large phosphor particles can be applied to the screen glass plate 15 by immersing the plate in an aqueous solution having a pH modifier; such as, salt or ester of a weak acid; and adding water suspension of the phosphor particles and a silicate to the solution so that the solution has a neutral pH value. The large phosphor particles will settle and adhere to the glass plate. Ordinarily, a period of time of 30-90 minutes is allowed for this settling of the large phosphor particles from the solution containing silicate and the gelatinous silicic acid onto the glass plate of the screen.

As previously noted, it has been found that the above process does not work well with the small, colloidal-sized, red-emitting phosphor particles. Most of these small phosphor particles remain in suspension, and those which settle on the larger phosphor particles do not adhere. Thus, it has been found that when the screen is tilted to pour off the liquid suspension, the smaller phosphor particles are also poured off; and even those few which settle do not adhere, but tend to accumulate, or agglomerate, between the larger phosphor particles on the glass plate. Consequently, the resulting display screen does not have the saturating characteristic illustrated by curve 33A in FIG. 3. The accumulated red particles produce, in spots, a brightness characteristic which does not level off but continues to increase as illustrated by curve 33B.

Greatly improved results are obtained by adding a weak acid to the aqueous solution along with the smaller phosphor particles to adjust the pH to less than 5. The shift of the aqueous solution to lower pH effects the formation of nongelatinous, semicrystalline silicic acid in the solution which aids in settling and adhering the small phosphor particles to the larger phosphor particles.

The nongelatinous, semicrystalline, silicic acid effects the settling of the small phosphor particles from the clearing solution in about the same length of time required to settle the phosphor particles from the more viscous solution containing the gelatinous silicic acid. That is, allowing about 30-90 minutes is ordinarily sufficient time for the small phosphor particles to settle onto the large phosphor particles.

After the small phosphor particles have settled, the aqueous solution is decanted or siphoned from over the screen, the screen removed from the container and baked out. To effect the desired bake-out, the screen is ordinarily heated to a temperature of about 400° C. for a period of about 30 minutes. Somewhat higher temperatures and somewhat longer periods of time may be employed although the temperatures must not be high enough to adversely affect the phosphor or the glass screen. In this way the water is driven from the silicic acid and forms an inorganic bonding, probably of silicate, which adheres the phosphor particles and the screen into a unitary color display screen.

In the process described hereinbefore the silicates will ordinarily be inorganic silicates. The alkali metal silicates such as sodium or potassium silicates are preferred.

The pH modifiers may be, as indicated, salts of weak acids which tend to decrease the relatively high pH of the aqueous solution of silicate. For example, barium acetate is preferred salt. Both barium acetate and acetic acid may be employed if desired. Other salts of weak acids such as formates or carbonates may be employed also. It was believed in the prior art that a salt had to be employed for its electrolyte properties; i.e., reducing the effect of charged layers on the phosphor particles. Applicant has found that acetic acid alone may be employed, without the necessity of employing inorganic salts.

In order to effect the pH range of 1–5 and effect settling of the small phosphor particles, it will ordinarily be necessary to employ an acid pH modifier. Since acetic acid has been found to work so well in both steps, it is ordinarily the acid pH modifier which will be employed to effect this pH of 1–5. Other acids such as formic, carbonic or carbolic acid can be employed. Furthermore, relatively strong acids such as hydrochloric acid or sulfuric acid can be employed with certain phosphors. Care must be taken however, that when strong acids are employed they do not form a reaction product with the phosphor which is soluble in the aqueous solution; or, conversely, form a precipitate on the surface of the phosphor which interferes with the electron beam exciting the phosphor to emit its color or the emission of the light.

The following example and descriptive notes regarding other findings by Applicant, may be helpful in clarifying points made in the foregoing description.

EXAMPLE

Preparatory to depositing the layer of phosphor particles onto the screen, 12 grams of 1.4 micron diameter, red-emitting phosphor europium-activated vanadate purchased on special order from Sylvania was mixed with 120 milliliters of water in a size 000 ball mill three-fourth full of porcelain balls. The mixture was ground 115 hours and removed. The samples were ground an additional 30 minutes each time prior to sample withdrawal.

A glass screen onto which blue and green phosphor particles had already been settled was placed in a container and 50 milliliters of 2½ percent by weight barium acetate, 150 milliliters of acetic acid and 2,000 milliliters of water were added to form a cushion water about the screen.

In some runs a drop of TRITON X-100 (a wetting agent) was added to the cushion water.

An aliquot of 2 to 3 milliliters of the red phosphor-water suspension was withdrawn from the ball mill and mixed with 50 milliliters of potassium silicate and 100 milliliters of water and added to the cushion water. The resulting pH was about 2.5 The system was allowed to stand for 1 hour and 20 minutes, then tilted slowly to decant the water from over the screen. Thereafter the screen was baked at 400° C. for about 30 minutes. It was found that the initial layer of blue and green phosphor particles had remained essentially continuous and the small red phosphor particles had bonded in a substantially uniform but discontinuous layer to the blue green phosphors.

In other runs preparing color display screens, it was found that the barium acetate could be omitted from the aqueous solution and only acetic acid employed and the same result effected.

Similarly, in other runs it was found that both phosphors could be settled from the same aqueous suspension by adjusting the pH from 7–8 for the large phosphor particles and subsequently adjusting the pH to 1–5, preferably 2–3 for settling the small phosphor particles.

Various changes can be made in the above described process without departing from the scope of the invention as defined by the appended claim. It is intended that all matter contained in the above description or shown in the accompanying drawings shall be interpreted as illustrative and not in a limiting sense.

I claim:

1. In a method of applying phosphor particles to a color display screen, the steps comprising:
   a. confining a body of water to overlie one surface of said display screen, said body of water having a pH factor in the range of 7 to 8;
   b. colloidally suspending a first group of phosphor particles in said water;
   c. adding to aid body of water a second group of phosphor particles that are too large to be colloidally suspended in said body of water, and allowing said second group of phosphor particles to settle onto said one surface;
   d. adding an alkali metal silicate to said water; and
   e. adding and acid pH modifier to said water effective to produce a pH factor of less than 5 and to effect a nongelatinous, semicrystalline, precipitating form of silicic acid which traps said colliodally suspended particles and settles them out of colliodal suspension onto said second group of phosphor particles on said one surface of said display screen.

2. The method in accordance with claim 1, wherein said colloidally suspended particles have an effective diameter of less than 1 micron and said larger phosphor particles have an effective diameter of greater than 5 microns.

3. The method in accordance with claim 2 wherein said pH modifier is selected from the group consisting of barium acetate, acetic acid, formates, carbonates, hydrochloric acid and sulphuric acid.

4. In a method of applying layers of variable sized phosphor particles to a color display screen of the type having sidewalls which define a cavity, comprising the steps of:
   a. filling at least a portion of said cavity with an aqueous solution, said solution covering one surface of said color display screen;
   b. preparing said variable size phosphor particles to include a first group of particles that become colloidally suspended when placed in an aqueous solution, and a second group of particles that settle when placed in an aqueous solution;
   c. adding said variable sized particles to said aqueous solution wherein said first group of particles becoming colloidally suspended in said solution, and said second group of particles falling through said solution and settling in close proximity to said one surface of said display screen;
   d. adding an alkali metal silicate to said solution;
   e. adding a pH modifier to said solution to produce a pH factor of about 7;
   f. allowing time for said alkali metal and pH modifier to form a gelatinous silicic acid effective to adhere said second group of particles to said one surface of said display screen;
   g. adding an additional amount of a pH modifier to said solution to produce a pH factor of less than 5, said additional pH modifier forming a nongelatinous, semicrystalline, precipitating form of silicic acid effective to trap said first group of particles to effect precipitation thereof;
   h. allowing time for said precipitating silicic acid-entrapped first group of particles to settle onto and adhere to said second group of particles;
   i. removing the supernatant liquid from said cavity; and
   j. baking-out said display screen, aid first and second group of particles, and said silicic acid to form said color display screen.

5. The method in accordance with claim 4, wherein aid first group of phosphor particles have an effective diameter of less than 1 micron, and said second group of phosphor particles have an effective diameter of greater than 5 microns.

6. The method in accordance with claim 4, wherein aid pH modifier is selected from the group consisting of barium acetate, acetic acid, formates, carbonates, hydrochloric acid and sulphuric acid.

7. The method in accordance with claim 4, wherein said pH factor of step (f) is between 2 to 3.

8. In a method of applying layers of variable sized phosphor particles to a color display screen of the type having sidewalls which define a cavity, comprising the steps of:
  a. filling at least a portion of said cavity with an aqueous solution, said solution covering one surface of said color display screen;
  b. preparing a first group of phosphor particles of a size that settle when placed in an aqueous solution;
  c. adding said first group of particles to said solution, wherein said first particles fall through said solution and settle in close proximity to said one surface of said display screen;
  d. adding an alkali metal metal silicate to said solution;
  e. adding a pH modifier to said solution to produce a pH factor of about 7;
  f. allowing time for said alkali metal and pH modifier to form a gelatinous silicic acid effective to adhere said first group of particles to said one surface of said display screen;
  g. preparing a second group of phosphor particles of a size that become colloidally suspended when placed in an aqueous solution;
  h. adding said second group of particles to said solution wherein said second particles become colloidally suspended in said solution;
  i. adding an additional amount of a pH modifier to said solution to produce a pH factor of less than 5, said additional pH modifier forming a nongelatinous, semicrystalline, precipitating form of silicic acid effective to trap said second group of particles to effect precipitation thereof;
  j. allowing time for said precipitating, silicic acid-entrapped second group of particles to settle onto and adhere to said first group of particles;
  k. removing the supernatant liquid from said cavity; and
  l. baking-out said display screen, said first and second group of particles, and said silicic acid to form said color display screen.

* * * * *